Nov. 17, 1970     H. B. FRENCH     3,540,130
ROUTING TEMPLATE JIG
Filed Oct. 25, 1968
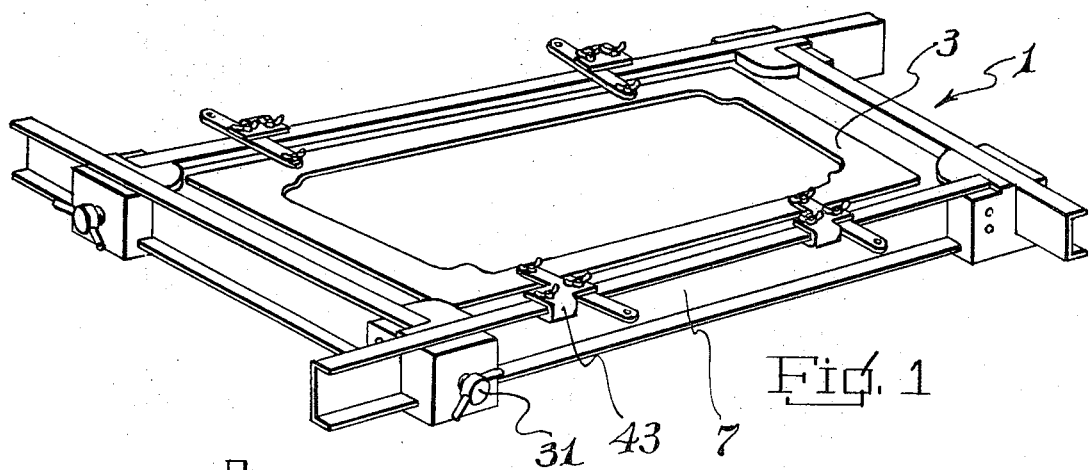
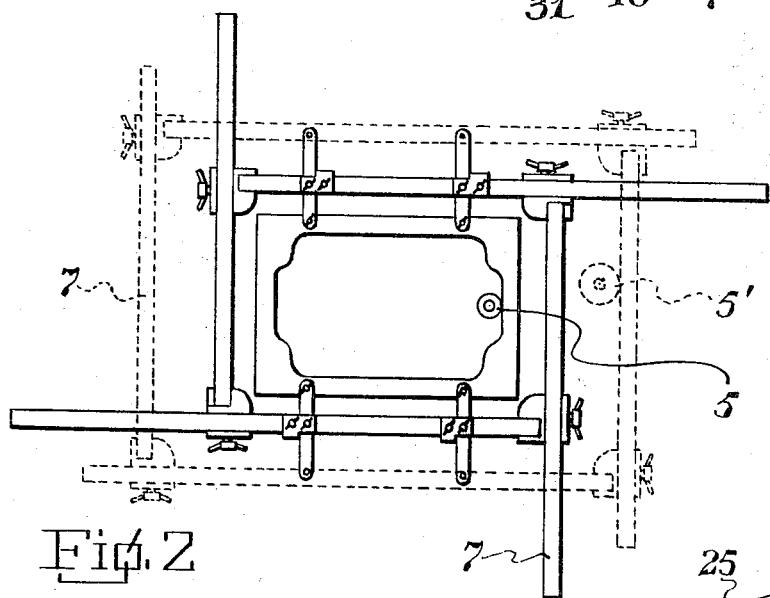
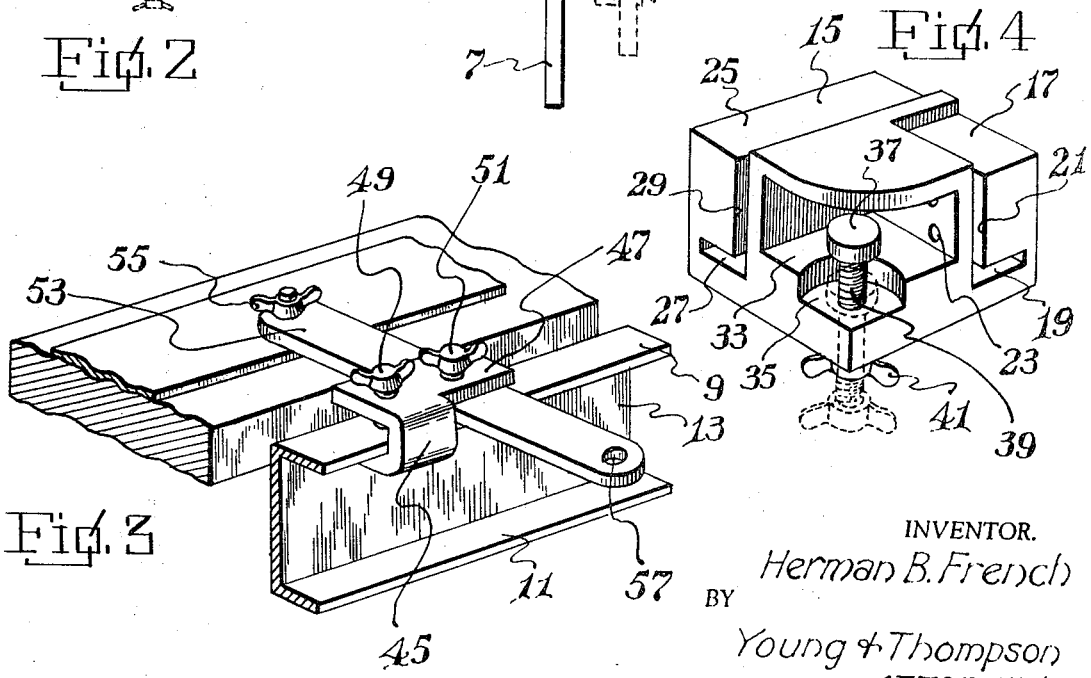
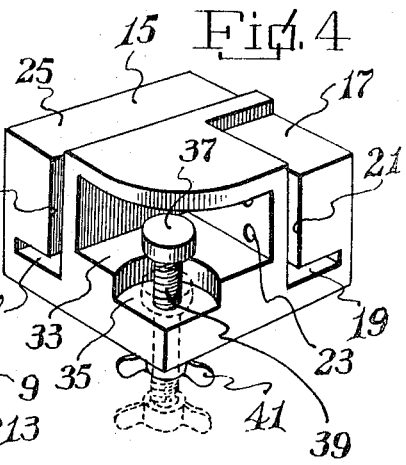
INVENTOR.
*Herman B. French*
BY *Young & Thompson*
ATTORNEYS

United States Patent Office 3,540,130
Patented Nov. 17, 1970

3,540,130
ROUTING TEMPLATE JIG
Herman B. French, 8348 E. 117th Ave. S.,
Bixby, Okla. 74008
Filed Oct. 25, 1968, Ser. No. 770,589
Int. Cl. G01b 3/14
U.S. Cl. 33—174     3 Claims

ABSTRACT OF THE DISCLOSURE

A routing template jig has side beams that slide and lock relative to each other to form any shape and a wide variety sizes of rectangles for guiding a routing tool to form ornamental designs on panels such as doors. The beams slide in corner blocks, which also support the corners of the panel. Brackets are adjustably slidable along the beams for holding a template in any desired position.

---

The present invention relates to routing template jigs, more particularly of the type adapted to be secured to a panel or other rectangular member of wood, plastic, composition board or other rigid but readily workable material, for the purpose of guiding a routing tool that performs ornamental routing on the panel. The jig of the present invention is adapted to guide the routing tool with or without the aid of a special template carried by the jig.

It is an object of the present invention to provide a routing template jig by the use of which an entire routing operation can be performed without the need for resetting or readjusting any parts during the operation.

Another object of the present invention is the provision of a routing template jig that does not leave undesired marks on the panel.

Finally, it is an object of the present invention to provide a routing template jig which will be relatively simple and inexpensive to manufacture, quick and easy to assemble and set and operate, and rugged and durable in use.

Other objects and advantages of the present invention will become apparent from a consideration of the following description, taken in connection with the accompanying drawing, in which:

FIGURE 1 is a perspective view of a jig according to the present invention, shown in use as a support for a template for performing a routing operation on a panel;

FIGURE 2 is a top plan view of the assembly of FIG. 1 showing one adjusted position of the parts in full line and another adjusted position of the parts in phantom line;

FIGURE 3 is an enlarged fragmentary perspective view of a bracket for holding a template to the beams of the jig; and FIGURE 4 is an enlarged perspective view of a corner block forming a portion of the present invention.

Referring now to the drawing in greater detail, there is shown a routing template jig indicated generally at 1, for use in supporting a template 3 that guides the movement of a router bit and bushing guide 5 about the contours of template 3. During this guided movement, as is well understood in this art, the router bit carves an ornamental design in one surface of the panel.

The jig comprises four beams 7 each of which has a pair of upper and lower outwardly extending horizontal flanges 9 and 11 and a vertical web 13. The beams 7 are adjustably interconnected to form a rectangular parallelogram of any desired configuration, by means of corner blocks 15. As can best be seen in FIG. 4, each corner block 15 has three interconnected but blind recesses 17, 19 and 21 for the flanges 9 and 11 and the web 13 at the end of a beam 7 to which the corner block is to be fixedly and permanently secured by means of rivets received in rivet holes 23 in each corner block 15. Each corner block 15 is also provided with recesses 25, 27 and 29 for the reception of the flanges 9 and 11 and the web 13, respectively, of another beam at right angles to the previously mentioned beam; but these latter recesses are through recesses and the beam they receive is accordingly slidable in these recesses. A locking screw 31 passes through each block 15 from the outer side of the block to the recess 29, for releasably bearing against the web 13 of the relatively slidable beam 7 for adjustably fixing the position of the beams relative to each other.

When the upper flanges 9 of the beams that meet at a given corner block 15 are in their recesses 17 and 25, the upper surfaces of these flanges and the exposed upper surface of the corner block are all coplanar.

In the corner thus formed between the two associated beams 7, each corner block 15 has a recess 33 that is closed at its top and bottom and at two sides by walls of the corner block, which accordingly shape the recess 33 complementary to the shape of the corner of the panels to be routed. The bottom wall of each recess 33 is provided with a communicating upwardly opening recess 35 in which the head 37 of a screw 39 is disposed. Screw 39 may be raised by means of a wing nut 41; and when released, screw 39 will drop so that head 37 is disposed in recess 35 no higher than the level of the floor of the recess 33. Screw 39 is for the purpose of clamping a panel corner between head 37 and the underside of the top wall of recess 33, thereby firmly to hold the panel corner in recess 33 during routing.

Brackets 43 adjustably support the template 3 from beams 7. Each bracket 43 has a C-shaped portion 45 that outwardly encompasses the upper flange 9 of a beam 7 and a laterally extending portion 47. A set screw 49 passes through the upper leg of C-shaped portion 45 to bear releasably on the upper surface of flange 9 thereby to fix the adjusted position of bracket 43 along its associated beam 7. A locking screw 51 passes through laterally extending portion 47 and adjustably supports an arm 53 in fixed or horizontally swinging positions, depending on whether or not locking screw 51 is tightened. At its inner end, arm 53 has a locking nut assembly 55 by which the template 3 is adjustably supported in fixed or horizontally swinging positions, depending on whether or not assembly 55 is tightened, the arm 53 also having at least one extra hole 57 adjacent its outer end in case a smaller template 3 is to be used and hence a longer arm 53 is to be required.

In operation, the jig is laid flat on a table with the locking screws 31 released and the beams 7 in the phantom-line position of FIG. 2 so that all the corner blocks 15 clear the corners of the panel to be routed. If desired, the jig 1 can thus be laid over the panel; or if the template 3 and its brackets 43 are not yet in place, the panel can be laid into the recumbent jig. It is also possible to provide a low support for the panel on the table top, so that the corners of the panel will be at a suitable elevation relative to recesses 33 of corner block 15.

The beams 7 are then moved together in opposite pairs until the inner sides of the webs 13 bear against the panel edges. The locking screws 31 are then tightened, to transform the assembly of beams into a rigid and inextensible parallelogram of the same size and shape as the panel to be routed. The corners of the panel at this time are fully seated in the recesses 33.

Then the wing nuts 41 are turned until the panel corners are clamped between the heads 37 of screws 39 and the underside of the upper wall of the recess 33. The brackets 43 are then manipulated until the template 3 is in the desired position. Thereafter, the router bit and bushing guide 5 can follow the entire contour of the template to perform the full routing operation without the need for readjusting anything in the course of the operation.

It is not necessary to provide a separate or detachable template 3 in order to perform the present invention. Instead, it is possible to use the beams 7 themselves as the template; and the term "routing template jig" as used herein also include the jig without a separate template 3. In this latter instance, the router bit and bushing guide can have the relationship to the beam 7 shown in phantom line at 5' in FIG. 2.

In view of the foregoing disclosure, it will be evident that all of the initially recited objects of the invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A routing template jig comprising four straight beams, corner blocks adjustably slidably interconnecting said beams, each said corner block having a recess therein for the reception and retention of a corner of a workpiece to be routed, a template bracket carried by at least one of said beams, means for releasably securing said bracket in any of a plurality of positions of adjustment lengthwise of its associated beam, said bracket including an inwardly extending arm, and means for swingably interconnecting said arm with said bracket and with a said template and for releasably retaining said arm in any of a plurality of horizontally swung positions relative to said bracket and to a said template.

2. A jig as claimed in claim 1, said arm having a plurality of holes along its length for releasably connecting the arm to the bracket with the arm extending inwardly of the associated beam any of a plurality of different distances.

3. A jig as claimed in claim 1, said beams each having an outwardly extending upper flange, said template bracket being releasably secured to said upper flange.

References Cited
UNITED STATES PATENTS

| | | | |
|---|---|---|---|
| 157,288 | 12/1874 | Jenkins | 144—144.5 |
| 831,204 | 9/1906 | Woolf | 144—144.5 |
| 2,652,866 | 9/1953 | Drain. | |
| 3,199,556 | 8/1965 | Wing | 144—144.5 |
| 3,243,179 | 3/1966 | Wing. | |

SAMUEL S. MATTHEWS, Primary Examiner

U.S. Cl. X.R.

144—144.5